No. 757,383. PATENTED APR. 12, 1904.
F. C. YOUNG.
DEVICE FOR TEACHING PENMANSHIP.
APPLICATION FILED OCT. 19, 1903.
NO MODEL.
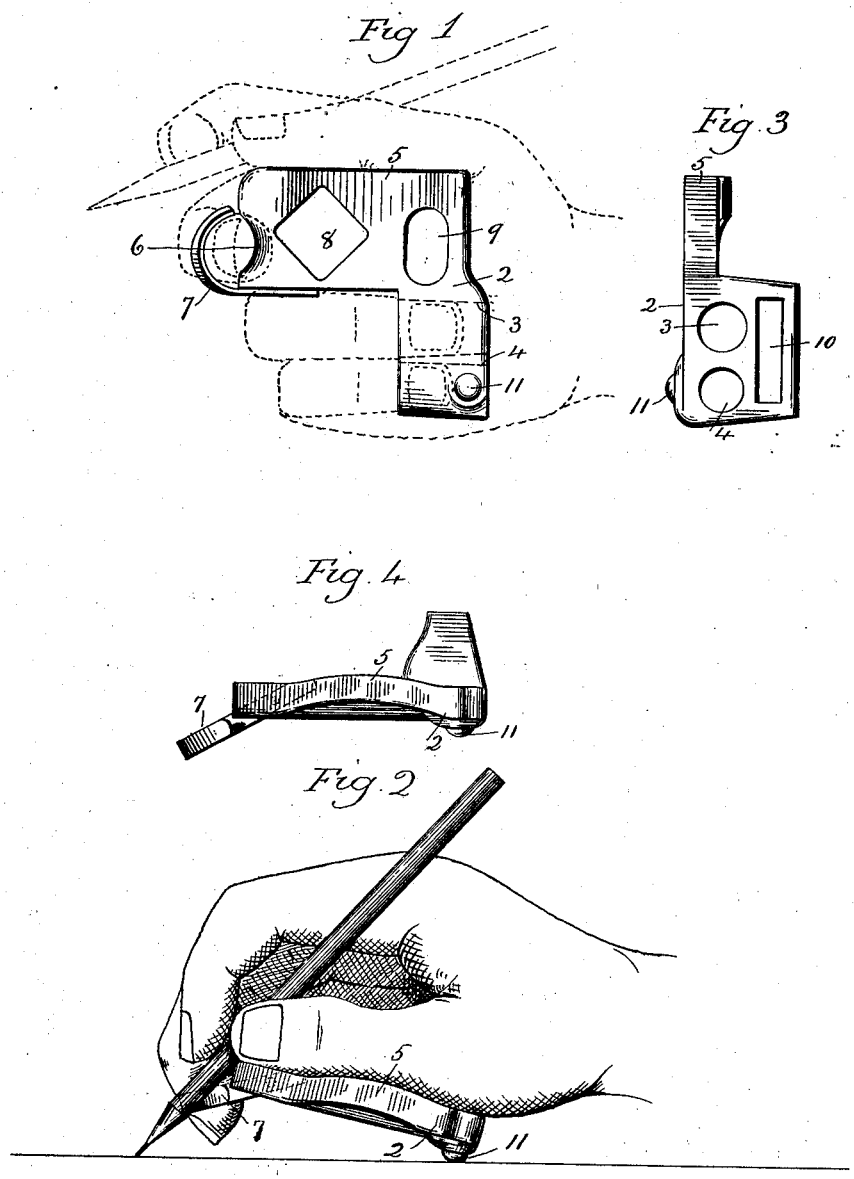

No. 757,383. Patented April 12, 1904.

UNITED STATES PATENT OFFICE.

FRANK C. YOUNG, OF NEW HAVEN, CONNECTICUT, ASSIGNOR OF ONE-HALF TO GEORGE A. BOOTH, OF NEW HAVEN, CONNECTICUT.

DEVICE FOR TEACHING PENMANSHIP.

SPECIFICATION forming part of Letters Patent No. 757,383, dated April 12, 1904.

Application filed October 19, 1903. Serial No. 177,693. (No model.)

*To all whom it may concern:*

Be it known that I, FRANK C. YOUNG, of New Haven, in the county of New Haven and State of Connecticut, have invented a new and useful Improvement in Devices for Teaching Penmanship; and I do hereby declare the following, when taken in connection with the accompanying drawings and the numerals of reference marked thereon, to be a full, clear, and exact description of the same, and which said drawings constitute part of this specification, and represent, in—

Figure 1, a view in inside elevation, showing one mode of using my improved device; Fig. 2, a view showing the position of the hand in writing when my improved device is being used; Fig. 3, a reverse plan view of the device; Fig. 4, a top view thereof.

My invention relates to an improvement in devices for teaching the right position of the fingers and the so-called "muscular" or "arm" movement now considered to be essential in learning the art of penmanship, the object being to produce a simple article constructed and arranged to not only require the fingers to take the right posture, but also to confine them when postured, so that the user will be compelled to employ not his fingers, but his arm in writing.

With these ends in view my invention consists in a device having certain details of construction, as will be hereinafter described, and pointed out in the claims.

In carrying out my invention as herein shown my improved device, which is made of wood or metal, consists of a wedge-shaped body 2, containing finger-holes 3 4 for the insertion of the third and fourth fingers, which are thus confined. The said body is formed at its upper end with an outwardly-extending flat finger-supporting arm 5, arranged at a right angle to it, the said body and arm being adapted in size to be comfortably contained within the palm of the hand. The outer edge of the arm 5 is cut away to form a concaved seat 6 for the end of the second finger, which is held in place by means of a hook-like sheet-metal finger-guard 7, pivoted to one edge of the arm and arching over the seat 6 aforesaid. The said arm is also formed with a rectangular finger-opening 8, through which the second finger may be passed if found more convenient to do so than to use it in grasping the edge of the arm by placing it in the seat 6, already described.

As shown, the body 2 is formed with openings 9 10 for the reduction of its weight. At its lower end the body is furnished with an antifriction-ball 11, arranged in position to ride upon the papers and take off some of the friction caused by the contact of the fingers and the outer edge of the hand with the papers. The antifriction-ball is also arranged so that it will not ride upon the paper except when the hand is in the correct and accepted position, so that it assists the student in taking the same.

It will be apparent that when the device is in position in the palm the second, third, and fourth fingers cannot be moved independently of each other, but are virtually tied up, while the pen is held by the thumb and forefinger and against the second finger. The fingers being thus confined, the pen can be held, but not moved by them as required for writing. The student is therefore compelled to write by "arm" movements also in the art of penmanship known as the "muscle" movements. Furthermore, the device compels the holding of the hand, fingers, and pen in what is acknowledged to be the proper position for the best writing, and, as aforesaid, it insures the arm movement, which secures the most open and legible formation of the letters and that ease and facility which enables the penman to write longer and faster without fatigue than when the characters are formed in whole or in part by finger movements.

In using my improved device the fingers may be arranged in different ways; but in any mode of using the device it sufficiently confines the fingers and gives a right position to the fingers and hand to be of great assistance in teaching or in "forming the hand."

If the pupil has once learned to write with this device, he will not only understand the correct position of the hand in writing, but will be enabled to control and use the hand in that position, so that only practice will be required to make a good penman of him. The device therefore makes the teaching of correct penmanship easy and secures uniform and good results.

I would have it understood that I do not limit myself to the exact construction shown and described, but hold myself at liberty to make such departures therefrom as fairly fall within the spirit and scope of my invention.

Having fully described my invention, what I claim as new, and desire to secure by Letters Patent, is—

1. A device for teaching penmanship, the said device having a body formed with one or more finger-holes and provided with an arm adapted to be grasped by the second finger, the said device being adapted to be contained within the palm of the hand.

2. A device for teaching penmanship, the said device having a body formed with finger-holes and provided with an arm adapted to be grasped by the second finger and furnished with a finger-guard.

3. A device for teaching penmanship, the said device having a body formed with finger-holes and provided with an arm adapted to be grasped by the second finger and extending outwardly at a right angle from the upper end of the said body, and the said arm being furnished at its outer end with a pivotal finger-guard arching over the outer edge of the arm.

4. In a device for teaching penmanship, the combination with a body formed with one or more finger-holes and provided with an arm to be grasped by the second finger, of an anti-friction-ball on which the device rides over the paper.

In testimony whereof I have signed this specification in the presence of two subscribing witnesses.

FRANK C. YOUNG.

Witnesses:
FREDERIC C. EARLE,
CLARA L. WEED.